United States Patent [19]
Schnee

[11] 3,921,587
[45] Nov. 25, 1975

[54] SELF CLEANING WATER TANK FOR BOVINE ANIMALS

[76] Inventor: William E. Schnee, 1521 E. 3rd Place, Mesa, Ariz. 85104

[22] Filed: Dec. 16, 1974

[21] Appl. No.: 532,849

[52] U.S. Cl. ................................. 119/78
[51] Int. Cl.² ............................... A01K 7/02
[58] Field of Search ............ 119/78, 79, 80, 72, 73, 119/61

[56] References Cited
UNITED STATES PATENTS

| | | | |
|---|---|---|---|
| 2,781,024 | 2/1957 | Lisec | 119/80 |
| 3,150,639 | 9/1964 | Sereda | 119/78 |

Primary Examiner—Hugh R. Chamblee
Attorney, Agent, or Firm—Cahill, Sutton & Thomas

[57] ABSTRACT

A self filling self cleaning water fountain for bovine animals is disclosed. The fill water is dispensed adjacent the upper edge of the interior sides to wash the sides during each water fill operation. The washing water urges any sediment or debris adjacent the sides into the body of water wherein it will settle on the bottom. The surface of the bottom undulates so as to urge the settled sediment and debris to accumulate in the troughs of the bottom surface. A quick dump valve is disposed within a pipe, which pipe interconnects drains extending from each trough and through which the accumulated settled sediment and debris is exhausted.

9 Claims, 7 Drawing Figures

SELF CLEANING WATER TANK FOR BOVINE ANIMALS

The present invention relates to water fountains and, more particularly, to automatically filled self-cleaning water fountains for bovine animals.

In arid ranch lands it is common to have a water fountain for the domestic range animals located at various remote areas. These fountains are normally supplied with water by a wind driven pump interconnected with an adjacent well. Because of the remote location of these water fountains, they must be self filling so as to waste little, if any, of the pumped water. The state of the art sensing and valving apparatus are generally sufficiently accurate to serve this purpose. However, presently used water fountains suffer from one major problem: without periodic cleaning, the accumulated sediment and debris which has been deposited by the wind and the animals themselves will tend to contaminate the water or clog the valving mechanisms. Hence, a range rider, or the like, must periodically scrub down and clean the water fountains.

In cattle feed lots, or the like, where a large number of animals per acre are kept for periods of time, automatic watering apparatus must be employed to satisfy the water consumption rate. With the large number of animals in close proximity to the water fountains, contamination thereof due to dirt and debris becomes a substantial problem.

In the first above described situation, the maintenance costs in having a range rider circulate between the outlying water fountains is substantial. In the second above described situation, several men may be required on a full time basis to maintain the water fountains clean and relatively uncontaminated. The costs associated therewith are also substantial.

The following U.S. patents are representative of the state of the art of water fountains: Nos. 1,092,250, 1,218,899, 2,165,753 and 2,724,365.

It is therefore a primary object of the present invention to provide a self cleaning water fountain for domesticated animals.

Another object of the present invention is to provide a self cleaning water fountain which automatically and cyclically washes the sides and bottom surfaces of a watering fountain.

Still another object of the present invention is to provide a means for collection and disposing of accumulated sediment and debris within a water fountain.

Yet another object of the present invention is to provide a quick dump system for disposing of accumulated sediment and debris within a water fountain.

A further object of the present invention is to provide a self filling water fountain which simultaneously washes the surfaces of the water fountain during each fill cycle.

A still further object of the present invention is to provide animal interference free water filling and washing apparatus for a water fountain.

These and other objects of the present invention will become apparent to those skilled in the art as the description thereof proceeds.

The present invention may be described with greater specificity and clarity with reference to the following figures, in which.

Figure 1:
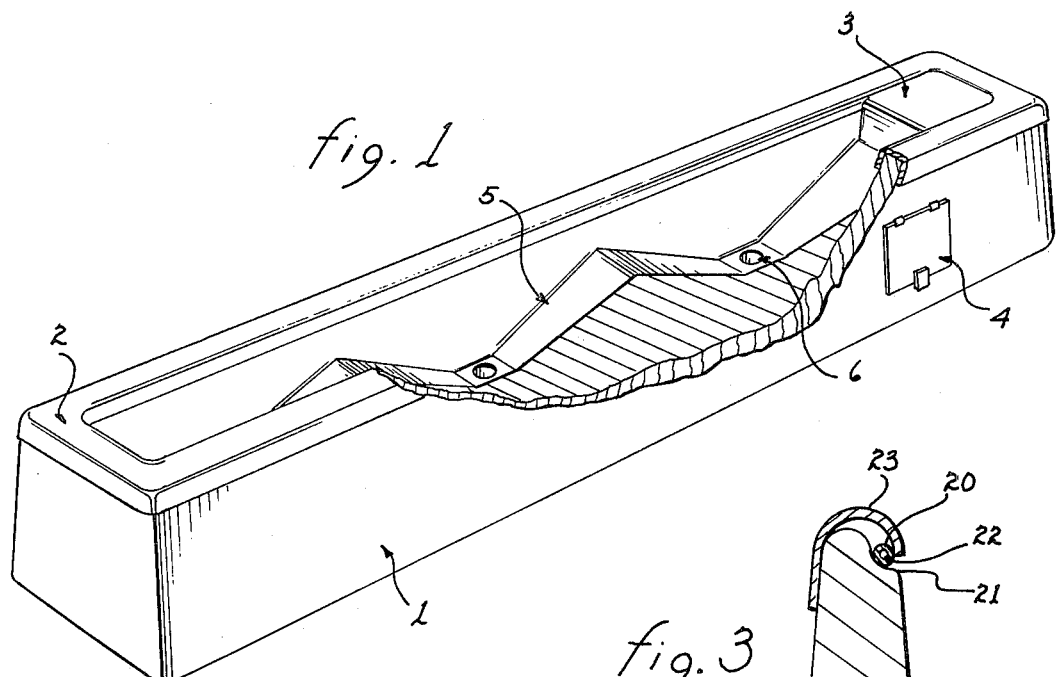
FIG. 1 is a perspective view having a partially cutaway section and illustrating the present invention.

To minimize the water surface area of water fountains, and thereby minimize the amount of blown in debris, and to maximize the accessiblity to watering animals, most water fountains are constructed in the form of elongated rectangular structures. Further, these structures must be of a height commensurate with the size of the animal for which the water fountain is intended. Referring to FIG. 1, there is shown a water tank 1 which is approximately 11 feet long, 21 inches wide and 28 inches high. A tank of this size is physically compatible with cattle yet it will tend to discourage most other wild or domesticated animals of smaller size from drinking the water or bathing in it. Thus, contamination of the water will occur primarily from wind blown dirt and the dirt brought to the water by the cattle themselves.

The perimeter, or coaming 2 is preferably faced with metallic sheet material to provide good wear characteristics against rubbing by the cattle. The sheet metal will also prevent the cattle from chewing and thereby damaging the coaming. A cover 3 is disposed within tank 1 at one end thereof to house and protect the water fill mechanisms. A hatch 4 is disposed within the side of tank 1 to provide access to a quick dump valve, as well as repair or maintenance of certain plumbing junctions. The bottom 5 of the tank is non-planar and defines an undulating surface composed of adjacent upwardly and downwardly sloping surfaces. A drain 6 is located at the trough defined by two adjacent sloping surfaces. For convenience of manufacture and for constructional rigidity, the exterior and interior upwardly extending surfaces are formed with a slight slope. The significance of each of the above described elements and their functional interrelationships will become apparent in the following discussion.

Figure 3:
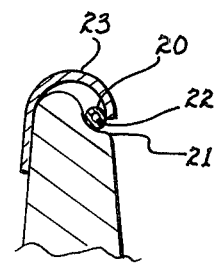
FIG. 3 is a partial cross-sectional view of the water disbursing apparatus.
Figure 2:
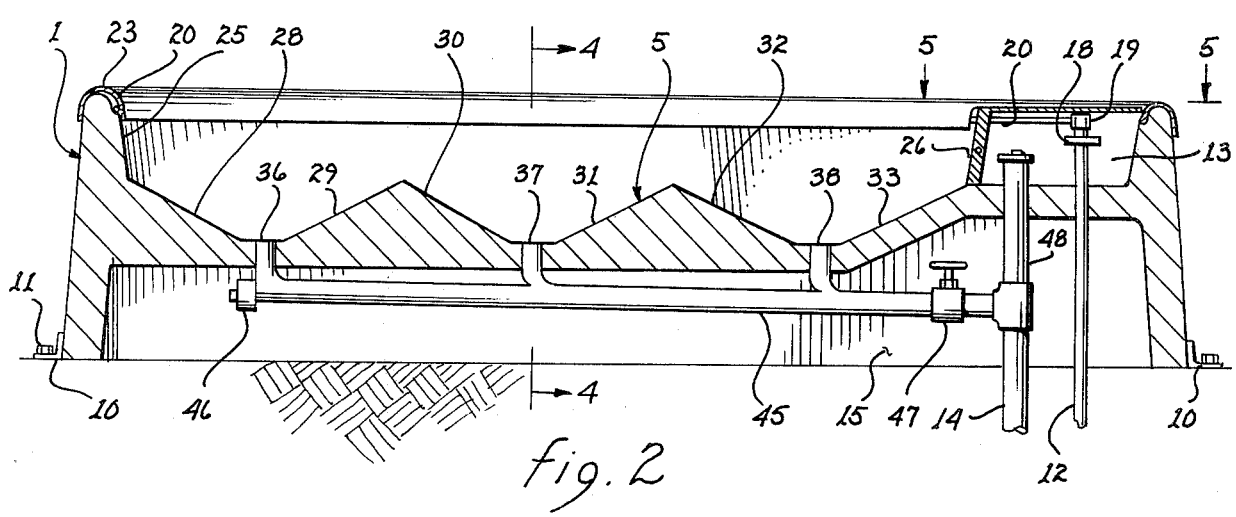
FIG. 2 is a cross-sectional view of the present invention.
Figure 4:
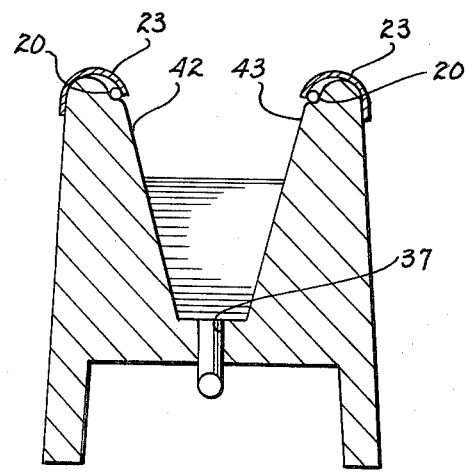
FIG. 4 is a cross-sectional view of the present invention taken along lines 4—4, as shown in FIG. 2.

Further details of the present invention and the operation thereof will be described with joint reference to FIGS. 2, 3 and 4. Tank 1, which can be readily made of fiberglass or similar moldable and formable materials, can be bolted to the ground to ensure immobility despite pressure from the watering cattle. The tank is anchored in place by bolt means 11 securing flanges 10 extending from each end of the tank to a concrete foundation, or the like.

As tank 1 is essentially immobile, an underground water fill pipe 12 can extend upwardly into tank 1 and terminate within compartment 13 of the tank. Likewise, a drain pipe 14 can extend from within a lower compartment 15 within tank 1 into the ground and to a suitable waste water discharge area. The inflowing water through fill pipe 12 is regulated by a float valve mechanism 18. Thence, the water flows through a manifold 19 into a generally U-shaped pipe 20 mounted about coaming 2 of tank 1.

As shown in the cross-sectional views of coaming 2, the upper interior edge is slightly depressed, as indicated by numeral 21, to receive and support water discharge pipe 20. The coaming is faced by a length of metallic sheet material curved so as to extend from about the outer edge of the coaming across the top and engage pipe 20 to retain the latter within depression 21. As may be noted from the referenced figures, the inner lateral edge of sheet material 23 terminates short of contact with the junction between depression 21 and the inner side wall. Pipe 20 is vented along its full length by a plurality of apertures 24. Apertures 24 are essentially in alignment with the space intermediate the lateral edge of sheet material 23 and the inner side wall of tank 1. Thereby, the water discharged from pipe 20 through apertures 24 flows downwardly along the respective portion of the inner side wall of tank 1 without interference from sheet material 23. From the above description, it may be appreciated that as tank 1 is periodically or cyclically filled by action of float valve 18, the fill water will tend to wash the inner side walls of tank 1.

The bottom 5 of tank 1 is formed by a plurality of adjacent oppositely sloping surfaces 28, 29, 30, 31, 32 and 33. That is, surfaces 28 and 29 extend downwardly toward one another and terminate in proximity to drain 36 where surface 28 extends downwardly from end wall 25; surfaces 30 and 31 extend downwardly toward one another and terminate in proximity to drain 37, where surface 30 extends downwardly from its intersection with surface 29; surfaces 32 and 33 extend downwardly toward one another and terminate in proximity to drain 38, where surface 32 extends downwardly from its intersection with surface 31 and surface 30 extends downwardly from end wall 26. As shown particularly in FIG. 4, side walls 42 and 43 of tank 1 extend downwardly toward one another and terminate in proximity to drains 36, 37 and 38.

Each of drains 36, 37 and 38 connects with a common drainage pipe 45. The end of pipe 45 in proximity to drain 36 may include a removable cover 46 for clean out purposes. Intermediate the drains and drainpipe 14, there is disposed a manually operated gate valve 47 or other quick discharge valves to permit selective manual dumping of the water within tank 1 through drainpipe 14. As will be appreciated by those skilled in the art, the quick dump feature will tend to cause sufficient suction about drains 36, 37 and 38 to induce any sediment or debris adjacent thereto to be sucked into the drains and discharged through drainpipe 14. A standpipe 48 may extend into compartment 13 to prevent water overflow within tank 1 and maintain the maximum level of water obtainable within the tank.

Figure 5:
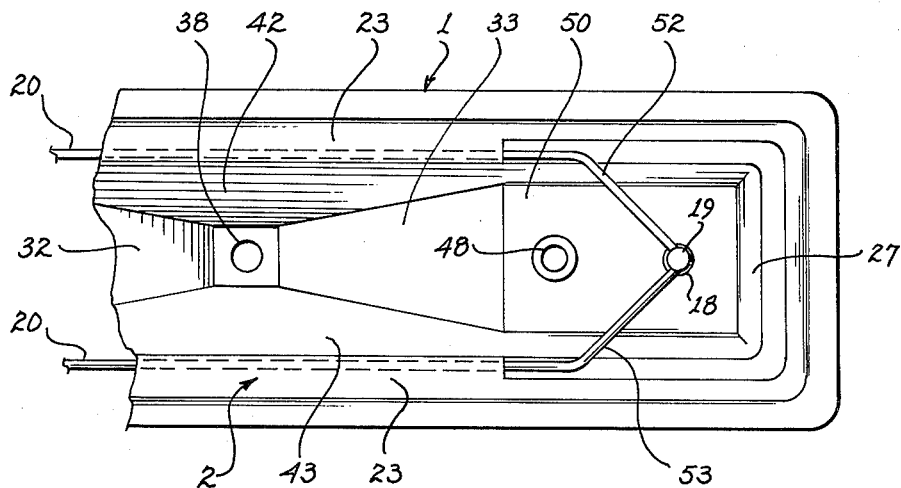
FIG. 5 is a top view of the present invention taken along lines 5—5, as shown in FIG. 2.
Figure 6:
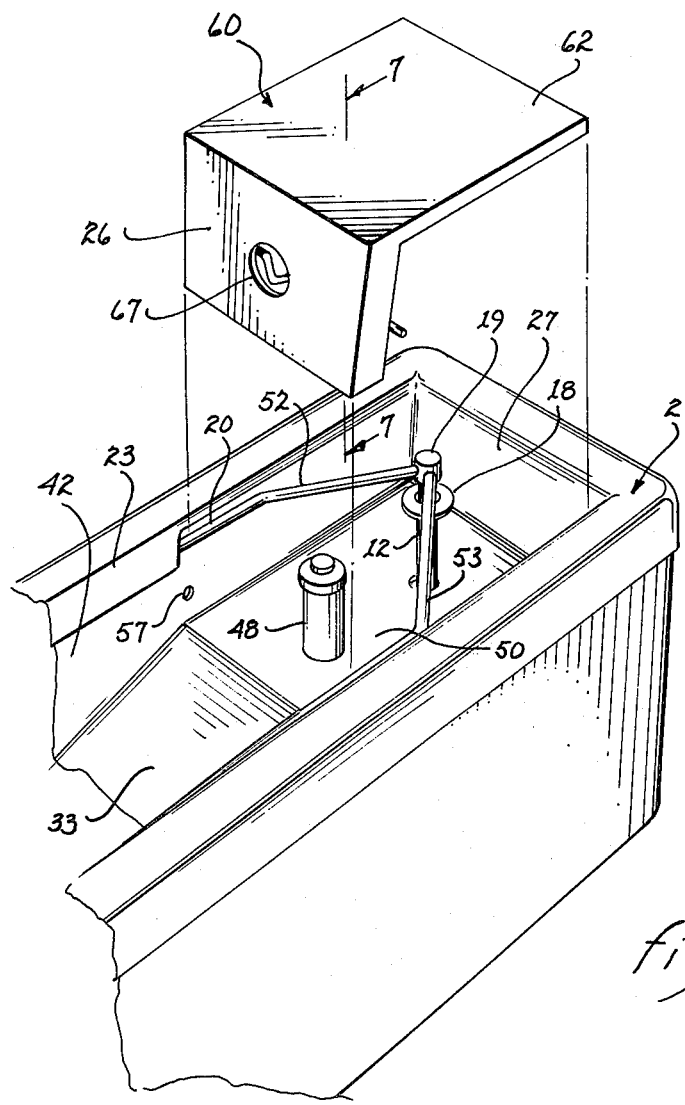
FIG. 6 is an exploded view of the water fill system and parts thereof.

Referring now jointly to FIGS. 5 and 6, the water fill system will be described in further detail. Compartment 13 is formed by an essentially horizontal surface 50 extending from the upper end of sloping surface 33 to end wall 27 of tank 1. Both the fill pipe 12 and standpipe 48 extend through surface 50. Float valve 18 is disposed in proximity to the upper end of fill pipe 12 to regulate the water discharge from the fill pipe. The upper end of fill pipe 12 terminates in a manifold 19. A pair of conduits 52 and 53 extend from manifold 19 to interconnect pipe 20 with the source of water. As illustrated in FIGS. 5 and 6, the entrance of pipe 20 intermediate sheet material 23 and depression 21 is accomplished within compartment 13 such that no exposed pipe will be accessible to the watering animals.

Figure 7:
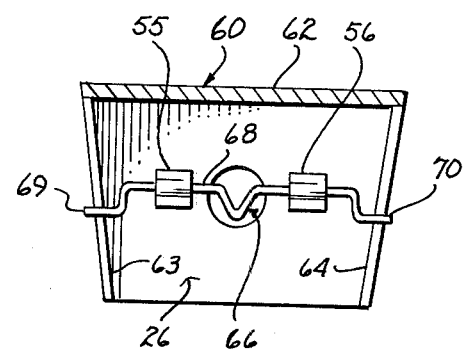
FIG. 7 is a cross-sectional view of the cover locking mechanism taken along line 7—7, as shown in FIG. 6.

Referring now to FIGS. 6 and 7, the cover 60 for compartment 13 will be described in greater detail. Cover 60 is essentially L-shaped and serves to establish an end wall 26 and top surface 62 for compartment 13. Side walls 42 and 43 and end wall 27 of tank 1 establish the remaining sides of compartment 13 and planar surface 50 defines the bottom of the compartment. Flanges 63 and 64 extend along the vertical and horizontal edges of cover 60 to add rigidity thereto and resist destruction thereof by the watering animals.

A locking mechanism 66 is attached to the inner surface of end wall 26 and is accessible therethrough by means of aperture 67. Aperture 67 also permits water flow into and out of compartment 13 commensurate with the water within the remainder of the tank. Additionally, some water leakage will occur about the periphery of end wall 26 to assure complete drainage of compartment 13 when tank 1 is emptied.

Locking mechanism 66 may take any one of several forms, of which only one is depicted. A formed wire-like element 68 having offset extending prongs 69 and 70 is pivotally secured to the rear surface of end wall 26 by means of pillow blocks 55 and 56. A pair of cavities, of which cavity 57 is illustrated in FIG. 6, are disposed within side walls 42 and 43 to receive prongs 70 and 69, respectively. By momentarily compressing element 68, prongs 69 and 70 are inserted within their respective cavities in the tank side walls. By pivoting element 68, cover 60 will be drawn toward end wall due to the offset feature of the prongs. Thus, cover 60 can be removably locked in place yet render the fill pipe 12, associated mechanisms and standpipe 48 readily accessible for maintenance purposes.

The operation of the present invention may be summarized as follows. Tank 1 is situated at any convenient location and may be rendered immobile by permanently anchoring flanges 10 to the ground. The water fill pipe 12 is connected to a source of water and drainpipe 14 is connected to an existing sump or the discharge therefrom may be onto the adjacent ground surface. Float valve 18 will permit water to flow through fill pipe 12 and pipe 20 until a predetermined water level within tank 1 is established. When the water level drops as the animals drink the water or due to evaporation, float valve 18 will permit regulated refilling. Each time the tank 1 is filled, the water flowing through apertures 24 of pipe 20 will tend to wash side walls 42 and 43 and end wall 25 of the tank. The washing action will tend to cause any debris located thereon to be washed downwardly toward the respective drains 36, 37 and 38. In addition, any movement of the water caused by the drinking animals will tend to agitate any sediment or particulate matter either suspended within the water or resting upon one of the slanted bottom surfaces to gravitate toward a respective one of the drains. Thereby, the refilling operation and the drinking animals will urge all debris and sediment to gravitate toward one or another of the drains. Periodically, gate valve 47 may be opened to permit either partial or complete drainage of the water within tank 1. Such drainage will tend to draw in and dispose of all sediment and debris in proximity to each of the drains. The drained water and contaminants therein, are, as stated above, transmitted to a sump or deposited upon a ground surface.

From the above description, it will become apparent to those skilled in the art that no longer is it necessary to periodically manually scrub the side walls and bottom of water fountains. This chore is now automatically performed by the present invention each time that the water tank is partially or completely refilled. Thereby, the present invention not only tends to provide the watering animals with relatively clean water but essentially eliminates tedious time consuming cleaning and the costs thereof.

Because of the configuration of bottom 5, the sediment and debris disposed within the water will tend to collect about each of the drains, instead of being relatively uniformly disposed across the bottom of the tank. Once the sediment and debris has become lodged in proximity to one of the drains, the upward sloping surfaces therefrom tend to retain the sediment and debris so situated. Thereby, there is less likelihood that the settled sediment and debris would be stirred up through normal use and it may be possible to perform extended cleanouts at relatively spaced intervals of time without jeopardizing the minimum degree of cleanliness necessary for the watering animals.

While the principles of the invention have now been made clear in an illustrative embodiment, there will be immediately obvious to those skilled in the art many modifications of structure, arrangement, proportions, elements, materials, and components, used in the practice of the invention which are particularly adapted for specific environments and operating requirements without departing from those principles.

I claim:

1. A self filling and self cleaning water tank for animals, including a source of water connected to a water fill pipe and a drain pipe for draining said tank, said water tank comprising:
   a. regulating means for periodically directing a flow of water from the water fill pipe into said tank commensurate with the water level within said tank;
   b. a water discharge pipe connected to the water fill pipe and located adjacent the upper interior edge of said tank for discharging water into said tank commensurate with the operation of said regulating means, said water discharge pipe including a plurality of apertures disposed therealong for discharging the water adjacent the interior sides of said tank to wash said interior sides;
   c. an undulating bottom surface for urging any sediment and debris within the water to gravitate toward the troughs of said bottom surface;
   d. a drain disposed at each of the troughs of said bottom surface;
   e. a drain pipe interconnecting each of said drains; and
   f. a quick dump valve disposed within said drain pipe for discharge of at least some of the water within said tank and the sediment and debris in proximity to each of said drains.

2. The water tank as set forth in claim 1 wherein said bottom surface is formed of pairs of oppositely sloping surfaces terminating at one of said drains.

3. The water tank as set forth in claim 1 wherein said interior side walls slope downwardly and inwardly to aid in channeling any sediment and debris toward a respective one of said drains.

4. The water tank as set forth in claim 3 wherein said bottom surface is formed of a plurality of slanted planar surfaces, the lowermost part of each of said surfaces terminating in proximity to one of said drains.

5. The water tank as set forth in claim 3 including a depression disposed about the perimeter of said upper interior edge of said tank for receiving said discharge pipe.

6. The water tank as set forth in claim 5 including a strip of curved sheet material extending along said upper edge of said tank, said sheet material forming a protective shield for said discharge pipe.

7. The water tank as set forth in claim 6 including a standpipe extending upwardly into said tank from the drain pipe to prevent overfilling of said tank.

8. The water tank as set forth in claim 7 wherein said regulating means and said standpipe are disposed within a segregated compartment of said tank.

9. The water tank as set forth in claim 8 including a removable cover for said compartment.

* * * * *